(12) United States Patent
Pai et al.

(10) Patent No.: US 10,013,792 B2
(45) Date of Patent: Jul. 3, 2018

(54) METHODS AND SYSTEMS FOR COMPUTER-BASED SKIN ANIMATION

(71) Applicant: Vital Mechanics Research Inc., Vancouver (CA)

(72) Inventors: Dinesh Pai, Vancouver (CA); Duo Li, Vancouver (CA); Shinjiro Sueda, Santa Maria, CA (US); Debanga Neog, Vancouver (CA)

(73) Assignee: Vital Mechanics Research Inc., Vancouver, British Columbia (CA)

( * ) Notice: Subject to any disclaimer, the term of this patent is extended or adjusted under 35 U.S.C. 154(b) by 0 days.

(21) Appl. No.: 14/901,326

(22) PCT Filed: Jun. 27, 2014

(86) PCT No.: PCT/CA2014/050620
§ 371 (c)(1),
(2) Date: Dec. 28, 2015

(87) PCT Pub. No.: WO2014/205584
PCT Pub. Date: Dec. 31, 2014

(65) Prior Publication Data
US 2016/0140750 A1 May 19, 2016

Related U.S. Application Data

(60) Provisional application No. 61/840,604, filed on Jun. 28, 2013.

(51) Int. Cl.
*G06T 15/08* (2011.01)
*G06T 13/20* (2011.01)
(Continued)

(52) U.S. Cl.
CPC ............ *G06T 15/08* (2013.01); *G06T 11/001* (2013.01); *G06T 13/20* (2013.01); *G06T 13/40* (2013.01)

(58) Field of Classification Search
USPC ................................. 345/473, 419, 646, 420
See application file for complete search history.

(56) References Cited

U.S. PATENT DOCUMENTS 6,266,071 B1    7/2001   Stam et al.
6,300,960 B1 *  10/2001  DeRose ................. G06T 13/40
                                                345/473

(Continued)

OTHER PUBLICATIONS

Banks et al. "A Brief Review of Elasticity and Viscoelasticity". Published May 27, 2010.*
(Continued)

*Primary Examiner* — Kimbinh T Nguyen
(74) *Attorney, Agent, or Firm* — Todd A. Rattray, Oyen Wiggs Green & Mutala LLP

(57) ABSTRACT

A method for simulating movement of a skin associated with a body comprises maintaining, by a computer, a representation of the skin comprising vertices, each vertex of the representation corresponding to a material point of the skin and comprising associated data, the associated data for each vertex comprising: constant body coordinates which represent a location of the material point of the skin relative to the body; and Eulerian skin coordinates specifying which one or more reference skin coordinates from among a set of reference skin coordinates correspond to the vertex at a particular time. Body coordinates and Eulerian skin coordinates may be maintained in two-dimensional spaces, which parameterize the surface of the body and skin.

21 Claims, 7 Drawing Sheets

(51) Int. Cl.
*G06T 11/00* (2006.01)
*G06T 13/40* (2011.01)

(56) References Cited

U.S. PATENT DOCUMENTS

| | | | | |
|---|---|---|---|---|
| 6,476,804 | B1* | 11/2002 | Costabel | G06T 13/20 |
| | | | | 345/419 |
| 7,493,243 | B2* | 2/2009 | Choi | G06F 17/5018 |
| | | | | 345/419 |
| 8,140,304 | B2 | 3/2012 | Ko et al. | |
| 8,144,155 | B2* | 3/2012 | Zhou | G06T 13/40 |
| | | | | 345/473 |
| 8,982,157 | B2* | 3/2015 | Weber | G06T 13/40 |
| | | | | 345/473 |
| 2006/0139347 | A1 | 6/2006 | Choi et al. | |
| 2006/0267978 | A1* | 11/2006 | Litke | G06T 17/30 |
| | | | | 345/419 |
| 2012/0236006 | A1* | 9/2012 | Miller | G06T 13/40 |
| | | | | 345/473 |
| 2012/0281019 | A1 | 11/2012 | Tamstorf et al. | |
| 2013/0041235 | A1* | 2/2013 | Rogers | A61B 5/6867 |
| | | | | 600/306 |
| 2013/0088497 | A1* | 4/2013 | Dilorenzo | G06T 13/40 |
| | | | | 345/473 |
| 2014/0071125 | A1* | 3/2014 | Burlina | G06T 7/00 |
| | | | | 345/420 |
| 2014/0198107 | A1* | 7/2014 | Thomaszewski | G06T 13/40 |
| | | | | 345/473 |
| 2014/0267306 | A1* | 9/2014 | Koniaris | G06T 15/04 |
| | | | | 345/473 |

OTHER PUBLICATIONS

Kamrin et al. "An Eulerian Approach to the Simulation of Deformable Solids Application to Finite-Strain Elasticity". Published 2009.*

Gelder, "Approximate Simulation of Elastic Membranes by Triangulated Spring Meshes", University of California Santa Cruz, pp. 1-16, Mar. 18, 2004, first published in Journal of Graphics Tools, vol. 3 Issue 2, pp. 21-42, Feb. 1, 1998 (Feb. 1, 1998).

Li et al., "Thin Skin Elastodynamics", ACM Transactions on Graphics (TOG)—Proceedings of SIGGRAPH 2013 Conference, vol. 32, Issue 4, Article No. 49, Jul. 2013 (Jul. 1, 2013).

Fan, Y., Levin, D. I. W., Litven, J., and Pai, D. K., 2013. Eulerian-on-Lagrangian simulation, ACM Transactions on Graphics (TOG), vol. 32, Issue 3, Jun. 2013, Article 22.

Kry, P. G., James, D. L., and Pai, D. K. 2002. Eigenskin: real time large deformation character skinning in hardware. In ACM SIGGRAPH/Eurographics Symposium on Computer Animation, 153-159.

Levin, D. I. W., Litven, J., Jones, G. L., Sueda, S., and Pai, D. K. 2011. Eulerian solid simulation with contact. ACM Trans. Graph. 30, 4 (July), 36:1-36:9.

Sueda, S., Kaufman, A., and Pai, D. K. 2008. Musculotendon simulation for hand animation. ACM Trans. Graph. 27, 3 (Aug.), 83:1-83:8.

Sueda, S., Jones, G. L., Levin, D. I. W., and Pai, D. K. 2011. Large-scale dynamic simulation of highly constrained strands. ACM Trans. Graph. 30, 4 (July), 39:1-39:9.

* cited by examiner

METHODS AND SYSTEMS FOR COMPUTER-BASED SKIN ANIMATION

RELATED APPLICATIONS

This application claims the benefit of the priority of U.S. application Ser. No. 61/840,604 filed 28 Jun. 2013, which is hereby incorporated herein by reference.

TECHNICAL FIELD

The technology disclosed herein relates to computer-based graphics. Particular embodiments provide methods and systems for computer-based animation of skin or a skin-like material.

BACKGROUND

There is a desire to provide models for use in computer-based animation of skin (or skin like layers) which simulate movement of the skin relative to the body. There is a general desire that such models, when rendered by suitable computer-based graphics engines, provide skin animation that appears realistic.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a method for simulating movement of a skin associated with a body, the method comprising: maintaining, by a computer, a representation of the skin comprising vertices, each vertex of the representation corresponding to a material point of the skin and comprising associated data, the associated data for each vertex comprising: constant body coordinates which represent a location of the material point of the skin relative to the body; and Eulerian skin coordinates specifying which one or more reference skin coordinates from among a set of reference skin coordinates correspond to the vertex at any particular time.

Another aspect of the invention provides method for simulating movement of a skin associated with a body, the method comprising: parameterizing the skin in terms of a two-dimensional skin space; and maintaining, by the computer, a representation of the skin comprising vertices, each vertex of the representation corresponding to a material point of the skin and comprising associated data. The associated data for each vertex comprises: two-dimensional skin coordinates corresponding to the material point of the skin in the two-dimensional skin space; and body coordinates which represent a location of the material point of the skin relative to the body.

Other aspects of the invention provide systems comprising one or more processors, wherein the processors are configured to perform methods according to any aspects of the invention.

Other aspects of the invention comprise computer program products comprising computer-readable instructions embodied on non-transitory media. When executed by a suitable computer or processor, the computer-readable instructions cause the computer or processor to perform methods according to any aspects of the invention.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Figure 1:
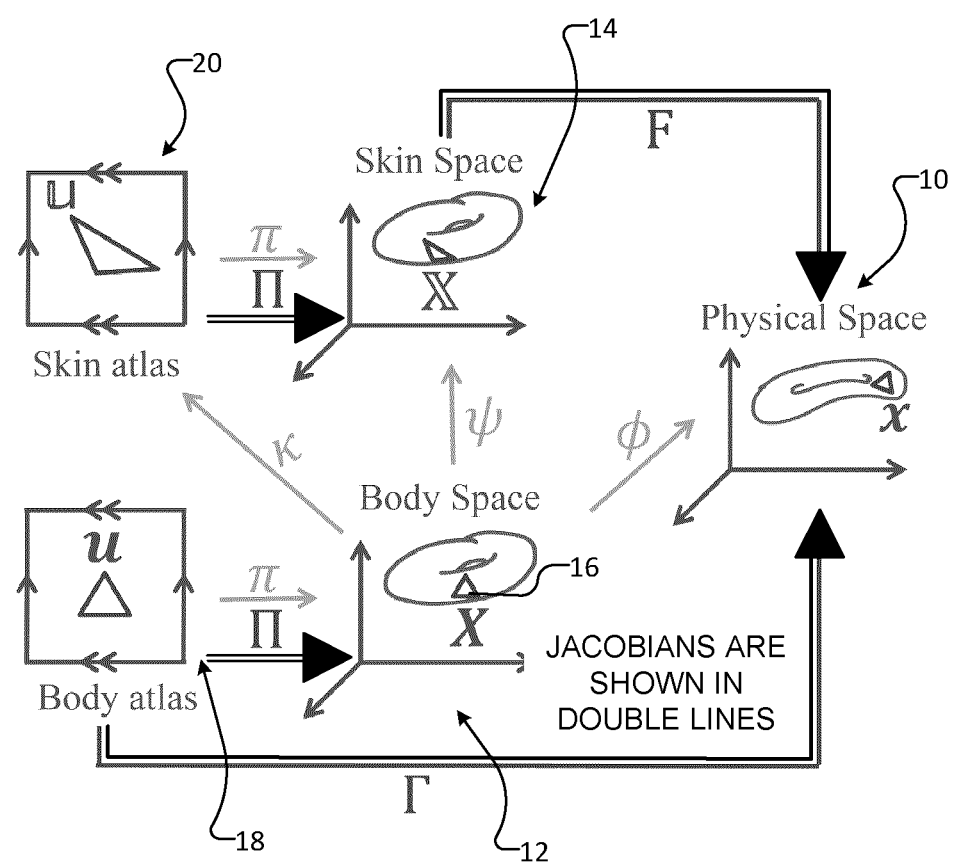
FIG. 1 is a schematic depiction of a number of spaces which include the skin space described in 3D Eulerian coordinates and the skin atlas described in 2D Eulerian coordinates and which are used in accordance with some embodiments of the invention.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

This disclosure refers to sub-cutaneous (or sub-surface) tissues (e.g. skeleton, muscles, fat, tendons and/or the like) that give a character a 3D shape as the "body" and use the word "skin" to describe a thin anatomical layer that covers the body. Particular embodiments provide systems and methods which provide models for use in computer-based animation of skin which simulate movement of the skin relative to the body. Such models may be used by suitable computer-based graphics engines to render skin animation that appears realistic It will be appreciated that "skin" is not expressly limited to actual skin and could comprise other types of skin-like layers, membranes, shells, muscle sheets and/or the like which move in relation to an internal (body-like) structures. Except where otherwise indicated by the context, use of the term skin in this disclosure and the accompanying claims ought to be understood to include such skin-like layers.

In some embodiments, models for computer-based animation of skin are provided wherein a single mesh is used to represent both the skin and the body. In some embodiments, the model comprises an Eulerian discretization of the dynamics of the skin moving on the body. The mesh may comprise a polygonal mesh, which in turn is represented by vertices (or nodes) and optionally edges between adjacent vertices. The physical properties of the skin may be represented by a hyperelastic material model (e.g. hyperelastic membrane model). In the Eulerian discretization, the mesh is fixed on the body. That is, vertex values for the body space and body atlas (explained in more detail below) do not evolve with time. In the Eulerian discretization, the Eulerian vertex values or Eulerian coordinates of the skin space and the skin atlas (explained in more detail below) do not represent particular skin particles (as they would in a more conventional Lagrangian representation), but instead represent information about what material point(s) of skin are at the vertex at any given moment in time. As discussed in more detail below, some embodiments may make use of reduced coordinates, which automatically constrain the skin to move on the body and constrain the skin from separating from the body. This constraint avoids the need for contact processing required by some prior art skin-modelling techniques.

Some embodiments provide methods and systems for computer-based skin animation which simulate the evolution of skin properties over time, in a discrete set of time steps, for example. As used in this disclosure, the phrase "time step" and similar expressions should be understood in a broad sense and should not be limited to time in a strict temporal sense. In some embodiments a time step may corresponds to a step of simulation time, that is, of time within a simulation environment. In some embodiments, a time step may correspond generally to a step in any numbered sequence (e.g., step 1, step 2, step 3, . . . ).

Typically, skin is in close contact with the underlying body and may share the body's geometry. Yet, the two are physically distinct. As discussed above, some embodiments of the invention make use of a single mesh (e.g. a triangular mesh, a hex mesh or some other polygonal mesh) which represents the objects of interest (e.g. the skin and body). As will be appreciated, however, the nodes and/or edges of such a mesh may comprise several values or several fields of values. Some embodiments of the invention make use of multiple values at each node. This concept may be understood by considering the different values retained at each node to be representative of the location of the same skin material point in different spaces. This disclosure defines a number of spaces which are depicted in Figure Methods according to some embodiments may comprise maintaining, for each vertex, either values/coordinates for each space or tools (e.g. transforms, Jacobian matrices and/or the like) to determine the values/coordinates for each space from the known values/coordinates. FIG. 1 shows an example of a torus-shaped body and a hyperelastic skin that covers the surface of the torus.

FIG. 1 shows a physical space 10, a body space 12 and a skin space 14. Physical space 14 represents the familiar 3D space in which objects live. Points (e.g. vertex values or coordinates) in the physical space 10 are denoted x. Body space 12 is the reference 3D space in which the surface of the body upon which the skin slides may be embedded. Points in body space 12 (e.g. vertex values or coordinates representing points on the surface of the body) are denoted X. FIG. 1 shows a representative face 16 (which in the illustrated embodiment is a triangle) of the mesh used to represent the exemplary torus body. Some embodiments make use of a 2D parameterization of the surface of the body. Such a 2D parameterization may be used because animation of the skin may be primarily concerned with the surface of the body, rather than its underlying 3D structure. Such a 2D surface parameterization may be referred to as the body atlas 18. Body atlas 18 may comprise a collection of 2D coordinate charts that parameterize the surface of the body. Points in body atlas 18 (e.g. vertex values or coordinates representing points on the surface of the body) are denoted u. This disclosure assumes that there is an invertible mapping $\pi: u \mapsto X$ between points in body atlas 18 and points in body space 12. It will be appreciated by those skilled in the art that there are many suitable techniques for determining such a mapping between a 3D surface and a 2D parameterization of the surface. The mapping r may be referred to as the parameterization. The mapping $\pi^{-1}$ may be referred to as the coordinate map.

The skin shares the shape of the body, but is made of distinct material that can move (e.g. slide) relative to the body. Therefore, in parallel to the body, the skin may be represented using a distinct reference 3D skin space 14 in which the skin is embedded. As discussed above, some embodiments of the invention comprise using an Eulerian discretization of the skin. In such embodiments, the vertex values or coordinates associated with skin space 14 comprise Eulerian 3D coordinates which represent information about what material point(s) of the skin are at the vertex at any given moment in time. In some embodiments, the skin may be embedded into skin space 14 in a stress-free state, although this is not necessary. In some embodiments, the skin may be assigned an initial stress in skin space 14. Like body atlas 18 described above, some embodiments make use of a 2D skin atlas 20 which is a 2D surface parameterization of skin space 14. Like skin space 14, the vertex values or coordinates associated with skin atlas 20 comprise Eulerian 2D coordinates which represent information about what material point(s) are at the vertex at any given moment in time. Advantageously, in some embodiments, using 2D skin atlas 20 and 2D body atlas 18 may automatically constrain the skin to move on the surface of body and constrain the skin from separating from the body. Points (e.g. Eulerian vertex coordinates) in skin space 14 and skin atlas 20 may be respectively denoted $\mathbb{X}$ and $\mathbb{U}$. Because the surfaces of the skin and body have the same shape, we can use the same mappings $\pi$ (and $\pi^{-1}$) to map between skin atlas 20 and skin space 14 (and vice versa) as used between body atlas 18 and body space 12 (and vice versa).

In some embodiments, a mapping between skin space 14 and physical space 10 is used to measure the elastic deformation and corresponding stresses in the skin. Similarly, in some embodiments, a mapping between body space 12 and physical space 10 is used to measure the change in shape of the body during the animation. Providing both skin space 14 and body space 12 allows the skin to be assigned an initial strain at t=0 (e.g. given by an initial set of Eulerian vertex values $\mathbb{U}$ in skin atlas 20 or by an initial set of Eulerian vertex values $\mathbb{X}$ in skin space 14). This is not necessary, however; in some embodiments, the skin has no initial strain at t=0.

It may be recalled that a mesh is a topological data structure, and any geometry associated with the mesh is due to values which may be associated with the vertices of the mesh. As discussed above, some embodiments comprise maintaining a single topological mesh, with multiple values associated with each vertex. Such values, may include, for example, Eulerian skin space coordinates $\mathbb{X}$, body space coordinates X, physical space coordinates x, Eulerian skin atlas coordinates $\mathbb{U}$ and body atlas coordinates u. There may be a one-to-one correspondence between the vertices in the various spaces. Accordingly, a single mesh may be considered to exist simultaneously in any of the spaces shown in FIG. 1. In the illustrated representation of FIG. 1, this is shown using a triangle in each of the spaces that corresponds to triangle 16 in body space 12.

In some embodiments, motion of the skin may be defined by two maps or mappings.

The body's movement in space may be specified by the body motion $\phi: X \mapsto x$. The mapping $\phi$ is an arbitrary motion and deformation of the body. In typical animation scenarios, this body motion $\phi$ is either specified by an artist or generated by another animation system. In some embodiments, the body motion $\phi$ may be understood to be an input. The body motion $\phi$ may be specified by its nodal values, $x_i$ (together with the nodal values $X_i$, which are typically given as initialization inputs) at each vertex i and may be linearly interpolated (e.g. using barycentric interpolation) between its vertices to produce a piecewise linear body motion function (or map) $\phi$. In some embodiments, the maps $\pi$ and $\pi^{-1}$ may be similarly represented after discretization by the nodal values $X_i$ and $u_i$. As discussed above, the same maps $\pi$ and $\pi^{-1}$ may be used for mapping between X and u and between $\mathbb{X}$ and $\mathbb{U}$. In some embodiments, the maps $\pi$ and $\pi^{-1}$ may be determined in the basis of X and u, and then used for $\mathbb{X}$ and $\mathbb{U}$.

The skin's movement relative to the body may be represented by the skin motion $\psi: X \mapsto \mathbb{X}$. Some embodiments provide methods and systems for determining or estimating this skin motion mapping $\psi$. It will be appreciated that the skin motion mapping $\psi$ may be determined based on knowledge of the nodal values of $X_i$ and $\mathbb{X}$ and interpolated between nodes. Similarly, $\mathbb{X}$ at each node i can be determined from $X_i$ and the skin motion mapping $\psi$ (or vice versa) and can be interpolated between nodes. In some embodiments, the skin motion $\psi$ may be represented indirectly, using a skin mapping, $\kappa: X \mapsto \mathbb{U}$, between body space 12 and skin atlas 20; in which case $\psi = \pi \circ \kappa$, where $\circ$ represents a composition of functions. Like skin motion mapping $\psi$, 2D skin motion mapping $\kappa$ may be determined based on knowledge of the nodal values of $X_i$ and $\mathbb{U}_i$ and interpolated between nodes. Similarly, $\mathbb{U}_i$ at each node i can be determined from $X_i$ and the skin motion mapping $\kappa$ (or vice versa) and can be interpolated between nodes. Some embodiments provide methods and systems for determining or estimating this skin map $\kappa$—i.e. for a given body motion (which may be specified by x and/or $\phi: X \mapsto x$). Using the skin map $\kappa$ (i.e. determining the evolution of the skin motion in terms of the 2D Eulerian coordinates of skin atlas 20) may be desirable, because the Eulerian skin atlas coordinates $\mathbb{U}$ may be used to timestep the motion of the skin in 2D coordinates, rather than in 3D coordinates, which in turn may avoid difficulties associated with prior art techniques where the skin must be constrained to lie on the body surface. As discussed above in connection with the body motion map $\phi$, the skin map $\kappa$ may be discretized using nodal Eulerian values $\mathbb{U}_i$ and interpolated to produce a piecewise linear skin map $\kappa$.

For brevity and clarity, this disclosure makes use of a slight abuse of notation, wherein an array of stacked vertices (e.g. $(\mathbb{U}_0, \mathbb{U}_1, \mathbb{U}_2, \ldots, \mathbb{U}_n)^T$) uses the same symbol as for individual vertices (e.g. $\mathbb{U}$). Those skilled in the art will appreciate the intent of such usage from the context.

Each vertex of the mesh represents a material point of the skin. Table 1 below summarizes the interpretations and values/coordinates stored, for some embodiments, at each vertex of the mesh.

TABLE 1

Summary of Per-Vertex Data

| Data | Interpretation | Source |
|---|---|---|
| x | current position of the skin (and body) in physical space | external input |
| X | coordinates of material point of skin in body reference space (i.e. body coordinates at which a material point of skin is located) | constant, external input |
| $\mathbb{X}$ | coordinates of material point of skin in skin reference space | determined or estimated according to embodiments of the invention |
| u | 2D body atlas reference coordinates corresponding to X | constant, optionally external input or determined or estimated according to embodiments of the invention |
| $\mathbb{U}$ | 2D skin atlas coordinates corresponding to $\mathbb{X}$ | determined or estimated according to embodiments of the invention |

The FIG. 1 mappings ($\pi$, $\pi^{-1}$, $\psi$, $\phi$) are piecewise linear and share the same mesh. Consequently, the Jacobian matrices of these mappings and composites thereof are constant on each face of the mesh (e.g. on each triangle in the case of a triangular mesh). For each map, these Jacobian matrices may be determined using vertex values in the domain and range of the map. This procedure is illustrated for the Jacobian matrix F of the composite map $\phi \circ \psi^{-1}$. This Jacobian matrix F is also the deformation gradient of the skin that may be used in some embodiments, as discussed in more detail below. It will be appreciated that the Jacobian matrices for all of the maps described above (and composites thereof) may be determined in an analogous manner.

For the purposes of explanation and without loss of generality, we assume, for the balance of this description that the faces of the mesh are triangles. For each triangle with vertex values $x_i$, $i=0, 1, 2$, the edge vectors $d_i = x_i - x_0$, $i=1,2$ may be constructed and assembled into a matrix $D_x$ having columns $d_i$. A similar matrix $D_{\mathbb{X}}$ may be constructed for each triangle from the Eulerian vertex values $\mathbb{X}_i$, $i=0, 1, 2$. By definition, the Jacobian matrix, $F = \partial x / \partial \mathbb{X}$, relates vectors in $\mathbb{X}$ to vectors in x. For the matrices $D_x$ and $D_{\mathbb{X}}$, this may be written as:

$$F D_{\mathbb{X}} = D_x \qquad (1)$$

If the vertex values $\mathbb{X}_i$ have only 2 coordinates, then $D_{\mathbb{X}}$ is square (i.e. 2×2) and the Jacobian matrix F may be determined based on $F = D_x D_{\mathbb{X}}^{-1}$. As discussed in more detail below, however, the Eulerian vertex values $\mathbb{X}_i$ in skin space 14 have 3 coordinates and, consequently, it is not straightforward to invert $D_{\mathbb{X}}$ to obtain $D_{\mathbb{X}}^{-1}$. Instead, this procedure may be generalized. However, should be understood at this stage that determining the Jacobian matrix F did not depend on the values X in the intermediate body space 12 or the Jacobian matrices of the constituent maps $\pi$ or $\psi$.

Figure 2:
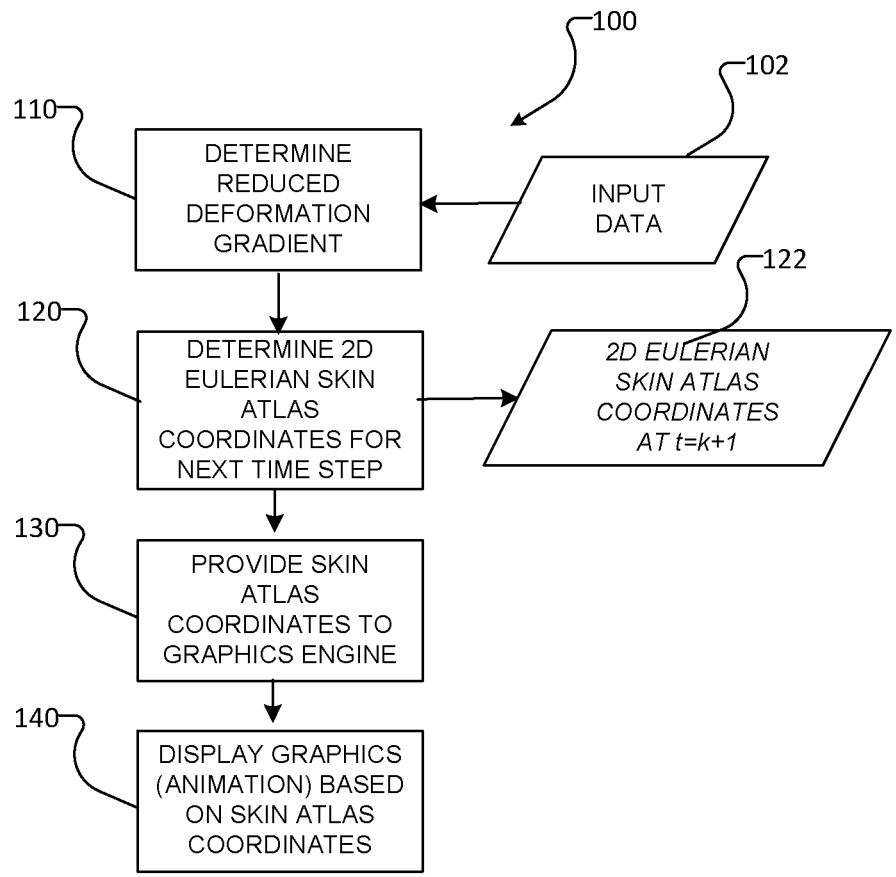
FIG. 2 is a schematic depiction of a method for determining an evolution of skin over a time step given a movement of a body associated with the skin according to an example embodiment.

FIG. 2 is a schematic depiction of a method 100 for determining an evolution of a skin over a time step given a movement of a body associated with the skin according to an example embodiment. Method 100 makes use of an Eulerian discretization. In the Eulerian discretization of method 100, the skin may be represented using the same mesh used to represent the movement of the body, with Eulerian vertex variables ($\mathbb{X}$ and/or $\mathbb{U}$ in skin space 14 and/or skin atlas 20 used to keep track of the evolution of the position of skin. Since the skin mesh and body mesh are thus aligned, computation of Jacobian matrices and/or of constraints between the skin and body may be simplified relative to Lagrangian discretizations which require maintaining a separate meshes for the skin and body. Method 100 of the FIG. 2 embodiment involves obtaining some input data 102 which may be used to perform method 100. Input data 102 may generally be obtained by any suitable technique from any suitable source. In some embodiments, some or all of input data 102 may be provided to a computer performing method 100 by a user (e.g. through a graphical user interface or other suitable interface (e.g. painting software, animation software, such as Maya™, and/or the like)). In some embodiments, method 100 may be a part of a more comprehensive computer-based graphics or animation system comprising software and/or hardware and some or all of input data 102 may be determined by the graphics or animation system in other routines (not shown). In some embodiments, some or all of input data 102 may be provided by external systems (e.g. graphics and/or animation systems). In some embodiments, some of input data 102 may be derived from other input data 102 (e.g. in steps of method 100 not expressly shown in FIG. 2).

In some embodiments, input data 102 comprises the initial 3D vertex coordinates x(k) (e.g. at k=0) for a polygonal (e.g. triangular) mesh associated with a body in physical space 10. The initial 3D vertex positions of the skin may also be part of input data 102. Where the skin is assumed to be stress free under initial conditions, the initial vertex positions (e.g. at k=0) of the skin may be the same as those associated with the body. Input data 102 may also comprise a description of movement of the body at the next time step, which may comprise the vertex coordinates of the body at the next time step (e.g. x(k+1)) in physical space 10. It will be appreciated, from the discussion above, that ϕ(k+1) could also be used as input data 102 to describe movement of the body at the next time step.

In some embodiments, input data 102 may also comprise, for each vertex, 3D reference coordinates X for the body in body space 12. Reduced (2D) vertex coordinates u for the body in body atlas 18 may also be provided as part of input data 102 or may be determined using $\pi^{-1}$ as discussed above. Method 100 makes use of an Eulerian discretization. As discussed above, with the Eulerian discretization, for each vertex, the coordinates X, u are also the coordinates used to describe the point at which a material point of skin may be located in body space 12, boday atlas 18. In some embodiments, input data 102 may also comprise initial (e.g. at k=0) 3D Eulerian vertex coordinates $\mathbb{X}$ (k) for the skin in skin space 14. Initial reduced 2D Eulerian vertex coordinates $\mathbb{U}$ (k) for the skin in skin atlas 20 may also be provided as part of input data 102 or may be determined using $\pi^{-1}$ as discussed above. In some embodiments, the vertex coordinates X, u and the initial Eulerian vertex coordinates $\mathbb{X}$ (k), $\mathbb{U}$ (k) may be determined from the initial vertex coordinates x(k) for the body in physical space 10.

Input data 102 may also comprise a number of material parameters which may describe or otherwise characterize the skin. Such material parameters may comprise a type of strain measure used for the skin (e.g. a Green strain, logarithmic strain, other Seth-Hill generalized strains and/or the like), a material model for the skin that utilizes a strain measure (e.g. a St. Venant-Kirchhoff model, a Neo-Hookean model, a Mooney-Rivlin model, a Fung model, a biological material model such as a model of muscle, fat or connective tissue, some other elastic or hyperelastic model, viscoelastic model, elastoplastic model and/or the like). Input data 102 may also comprise one or more constraints related to movement of the skin. For example, input data 102 may comprise constraints which specify where (e.g. which vertices) the skin is attached to the body (and is not permitted to move relative to the body) and where the skin is permitted to slide relative to the body. In some embodiments, such constraints may be provided or determined in body space 12, although this is not necessary. Input data 102 may also comprise one or more properties that define the mechanical coupling between skin and the body. For example, input data 102 may comprise viscoelastic properties of connective tissues that bind skin to body.

In some embodiments, a desired output of method 100 comprises determining how the skin moves (e.g. coordinates associated with the skin in some space at the k+1 time step) given the movement of the body between x(k) and x(k+1). In some embodiments, this output skin motion may be provided in the form of Eulerian coordinates $\mathbb{X}$ (k+1) in skin space 14 (or in the form of skin motion mapping ψ (discussed above) or in the form of skin motion mapping $\psi \circ \phi^{-1}$ (where, as discussed above, ϕ may be given or otherwise obtained as part of input data 102). In some embodiments, this output skin motion may be provided in the form of 2D Eulerian coordinates $\mathbb{U}$ (k+1) in skin atlas 20 (or in the form of skin motion mapping κ (discussed above) or in the form of skin motion mapping $\kappa \circ \phi^{-1}$ (where, as discussed above, ϕ may be given or otherwise obtained as part of input data 102).

Method 100 starts in block 110 which comprises determining a representation of a deformation gradient for each face of the mesh. The block 110 representation of the deformation gradient may relate to the rate of change of body coordinates x in physical space 10 with respect to the Eulerian skin coordinates (e.g. $\mathbb{X}$ in skin space 14 and/or $\mathbb{U}$ in skin atlas 20). In some embodiments, block 110 may comprise determining a reduced deformation gradient $\bar{F}$ for each triangle or face of the skin. The general deformation gradient F of the skin (i.e. the Jacobian matrix of the composite map $\phi \circ \psi^{-1}$) is discussed above. As also discussed above, a mesh face (e.g. triangle) in skin space may be stress-free, in which case, the Jacobian matrix F can be used to determine a strain measure on a per triangle basis. In some embodiments, the type of strain measure used for the skin may comprise the Green strain. In some embodiments, other types of strain measures could be used, as discussed above. Since the Eulerian coordinates $\mathbb{X}$ of skin space 14 comprise 3D coordinates, the above-discussed matrix $D_\mathbb{X}$ is a 3×2 matrix. Accordingly, $D_\mathbb{X}$ of equation (1) can not be simply inverted to obtain the deformation gradient F. Block 110 comprises determining a reduced deformation gradient $\bar{F}$ which captures the important deformation information which is relevant to each triangle in the mesh.

Figure 3:
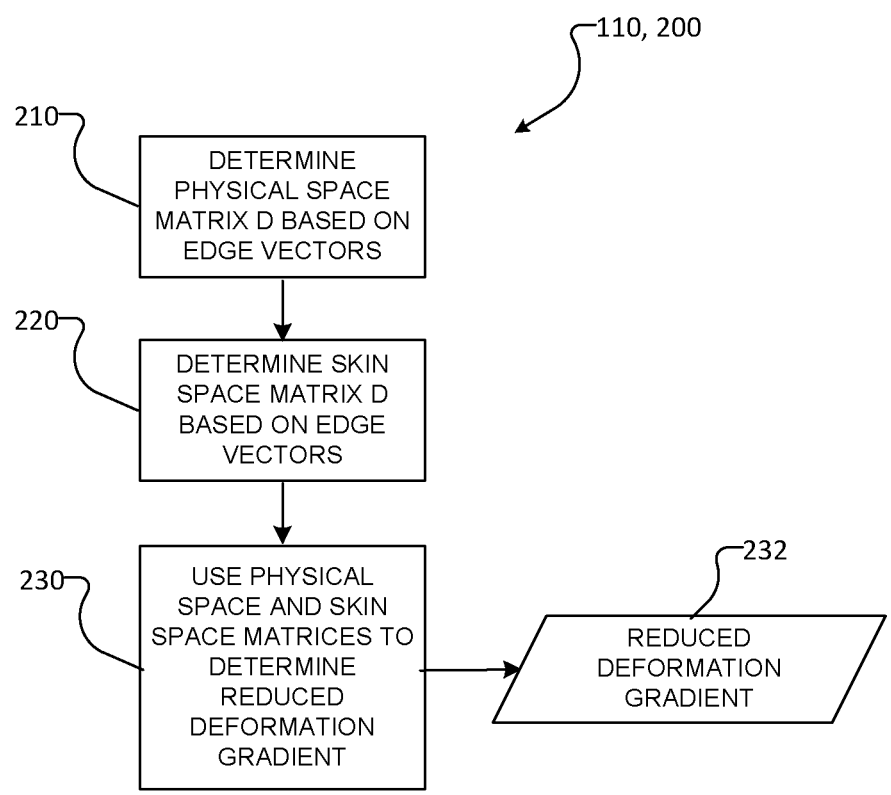
FIG. 3 is a schematic depiction of a method for determining a reduced deformation gradient $\bar{F}$ of the skin which may be used in the method of FIG. 2 in some embodiments.

FIG. 3 is a schematic depiction of a method 200 for determining a reduced deformation gradient $\bar{F}$ for each triangle of the skin according to a particular embodiment. In some embodiments, method 200 of FIG. 3 may be used to implement block 110 of FIG. 2. FIG. 3 commences in block 210 which comprises determining physical space matrix $D_x$. As discussed above, $D_x$ may be constructed in block 210 for each triangle. For each triangle with vertex positions $x_i$, i=0, 1, 2, physical space edge vectors $d_i = x_i - x_0$, $i=1,2$ may be constructed and assembled as columns $d_i$ of matrix $D_x$. Method 200 then proceeds to block 220 which comprises constructing a similar matrix $D_{\mathbb{X}}$ for each triangle in skin space 14 from the vertex coordinates $\mathbb{X}_i$, $i=0, 1, 2$ where the corresponding skin space edge vectors $D\mathbb{X}_i = \mathbb{X}_i - \mathbb{X}_0$, $i=1,2$, form the columns of $D_{\mathbb{X}}$.

Method 200 then proceeds to block 230 which comprises using the physical space matrix $D_x$ and the skin space matrix $D_{\mathbb{X}}$ determine the reduced deformation gradient $\bar{F}$ for each triangle of the skin. As alluded to above, each skin space vertex $\mathbb{X}_i$ has 3 coordinates and so the deformation gradient may not be generally determined from equation (1) by inverting $D_{\mathbb{X}}$. In some embodiments, block 230 comprise performing a QR decomposition of the matrix $D_{\mathbb{X}}$. Let $D_{\mathbb{X}} = Q_{\mathbb{X}} R_{\mathbb{X}}$ be the thin QR decomposition of $D_{\mathbb{X}}$ and define $\bar{F}=F Q_{\mathbb{X}}$. With these definitions, equation (1) can be re-written as $F D_{\mathbb{X}} = F Q_{\mathbb{X}} R_{\mathbb{X}} = \bar{F} R_{\mathbb{X}} = D_x$ and the reduced deformation gradient $\bar{F}$ may be determined by:

$$\bar{F} = D_x R_{\mathbb{X}}^{-1} \quad (2)$$

Intuitively, the columns of $Q_{\mathbb{X}}$ form the axes of an orthonormal frame for the plane of the triangle, with origin at $\mathbb{X}$. A point with coordinates in this new frame may be denoted $\bar{\mathbb{X}}$. In skin space 14, the point $\bar{\mathbb{X}}$ has 3D coordinates $\mathbb{X} = \mathbb{X}_0 + Q_{\mathbb{X}} \bar{\mathbb{X}}$. The columns of $R_{\mathbb{X}}$ are the edge vectors of the triangle in the new frame and $R_{\mathbb{X}}$ is the 2×2 reduced differential in this frame. It will be appreciated that there may be other techniques for extracting the important information from the matrix $D_{\mathbb{X}}$ and that such other techniques could be used in block 230 to determine the reduced deformation gradient $\bar{F}$. It may be observed that the reduced deformation gradient $\bar{F}$ is related to the deformation gradient $F$ by an orthogonal matrix $Q_{\mathbb{X}}$. Consequently, $\bar{F}$ is a matrix whose non-zero singular values are the same as those of the complete deformation gradient F. Non-limiting examples of other suitable techniques which could be used for this purpose include polar decomposition and singular value decomposition.

In the illustrated embodiment, the output 232 of method 200 is the reduced deformation gradient $\bar{F}$ for each triangle or face of the skin. The reduced deformation gradient $\bar{F}$ is a matrix whose non-zero singular values are the same as those of a complete deformation gradient F.

Figure 4:
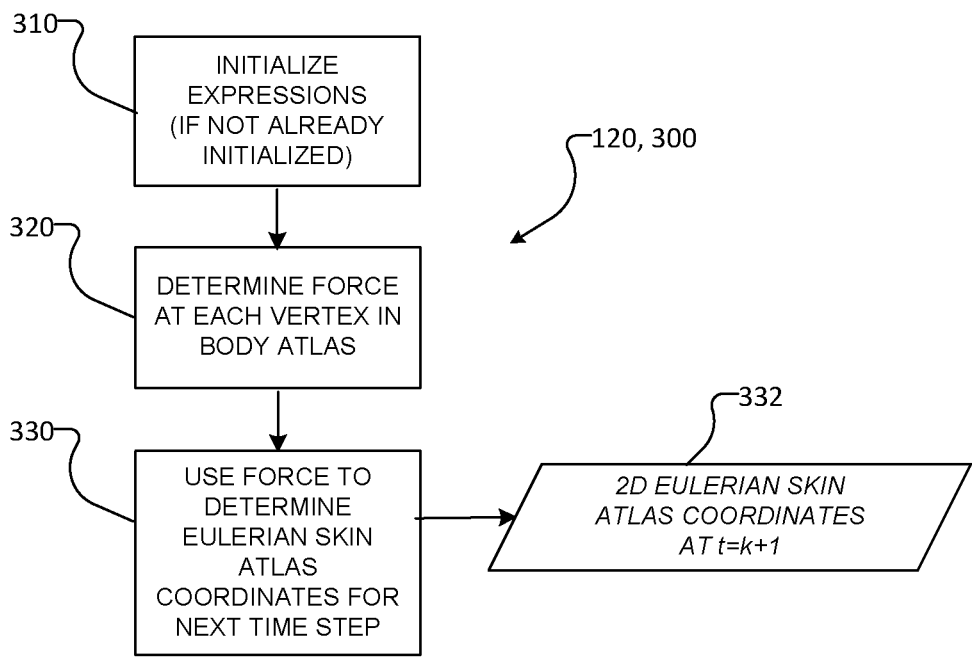
FIG. 4 is a schematic depiction of a method for determining 2D Eulerian skin atlas coordinates $\mathbb{U}$ for a next time step which may be used in the method of FIG. 2 in some embodiments.

Returning to method 100 (FIG. 2), after determining the reduced deformation gradient $\bar{F}$ for each triangle in block 110, method 100 proceeds to block 120 which comprises determining 2D Eulerian skin atlas coordinates $\mathbb{U}$ for the skin vertices at the next time step (e.g. $\mathbb{U}(k+1)$). Determining the 2D Eulerian skin atlas coordinates $\mathbb{U}$ in block 120 may be based on the block 110 reduced deformation gradient $\bar{F}$. FIG. 4 is a schematic diagram of a method 300 for determining 2D Eulerian skin atlas coordinates $\mathbb{U}$ for the next time step according to a particular embodiment. Method 300 of FIG. 4 may be used to implement block 120 of FIG. 2 in some embodiments.

Method 300 commences in block 310 which, in the illustrated embodiment comprises initializing a number of expressions (e.g. mathematical expressions). Initializing these mathematical expressions may comprise creating procedures, sub-routines and/or other software functions which, given a number of inputs, return a corresponding output. In some embodiments, block 310 comprises determining or otherwise initializing a number of mathematical expressions symbolically using suitable symbolic mathematical software, such as Maple™, Mathematica™ and or the like. In some embodiments, block 310 comprises determining or otherwise initializing a number of mathematical expressions using automatic differentiation software, such as ADOL-C™ and/or the like. Block 310 may be performed, for example, in the first iteration of method 300. In some embodiments, block 310 need only be performed once, whereafter the block 310 initialized expressions are known and the corresponding results can be numerically determined (e.g. using corresponding function calls and/or the like). In some embodiments, some or all of block 310 can be performed on multiple occasions. By way of non-limiting example, in some embodiments, some or all of block 310 can be performed for each new time step (e.g. for successive iterations of method 100). Some non-limiting examples of expressions which may be initialized by symbolic mathematical computation in block 310 are described in more detail below. In some embodiments, block 310 is not necessary. In some embodiments, the parameters used or determined in the remainder of method 300 may be used or determined using suitable numeric techniques without the block 310 initialization.

Figure 5:
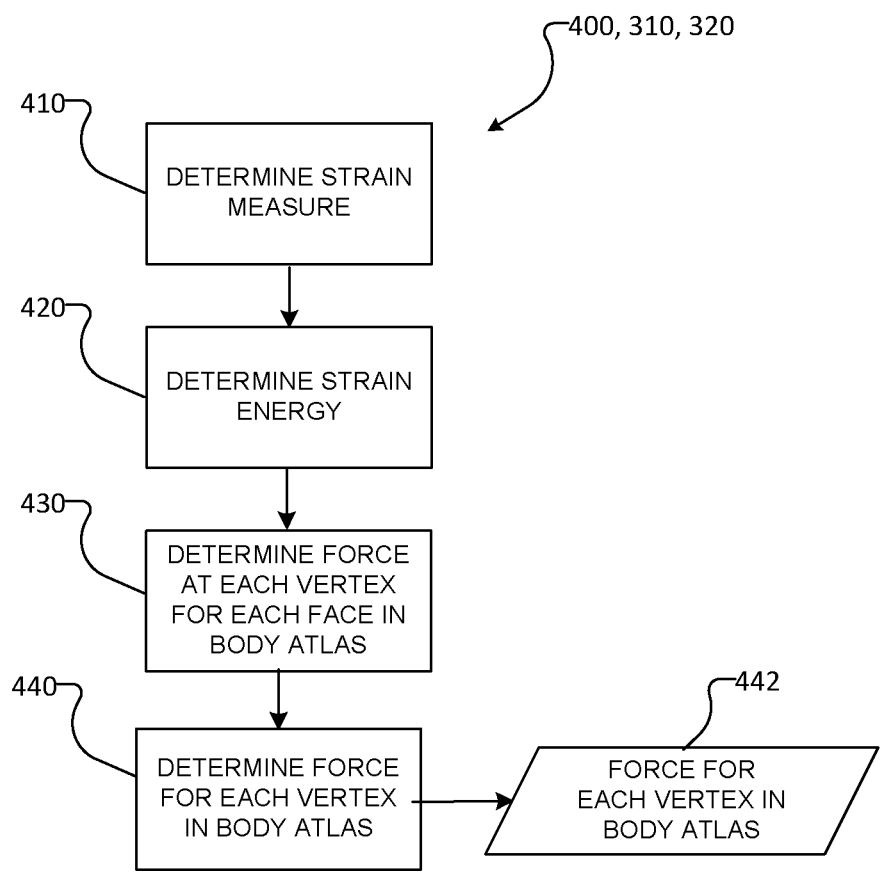
FIG. 5 is a schematic diagram of a method for determining a force $f_i$ at each vertex i in the body atlas which may be used in the method of FIG. 4 in some embodiments.

After initializing expressions in block 310, method 300 proceeds to block 320 which, in the illustrated embodiment, comprises determining a force $f_i$ at each vertex i in body atlas 18. FIG. 5 is a schematic diagram of a method 400 for determining the force $f_i$ at each vertex i according to a particular embodiment. In some embodiments, method 400 of FIG. 5 may be used to implement block 320 of method 300 (FIG. 4). In some embodiments, method 400 may be based on or otherwise use some of the block 310 initialized expressions. Method 400 of the illustrated embodiment comprises blocks 410, 420, 430 which may be performed in whole or in part as part of the block 310 initialization of expressions. As discussed above, all or part of these (block 410, 420, 430) procedures may be initialization procedures and need not be performed in each iteration of method 400.

Block 410 involves determining a strain measure associated with the skin. Like the determination of the reduced deformation gradient $\bar{F}$ discussed above, block 410 may comprise determining a reduced strain measure $\bar{E}$ (e.g. a 2×2 matrix) which may be determined for each triangle or face of the skin. $\bar{E}$ (when compared to the 3×3 matrix of 3D strain measure E) may ignore the strain components which are perpendicular to the planes of the surface triangles. In some embodiments, the type of strain measure used in block 410 is the Green strain which may be determined using the block 110 deformation gradient $\bar{F}$ according to the left-most equality of:

$$\bar{E} = \frac{1}{2}(\bar{F}^T \bar{F} - I) = \frac{1}{2}(Q_{\mathbb{X}}^T F^T F Q_{\mathbb{X}} - I) = Q_{\mathbb{X}}^T E Q_{\mathbb{X}} \quad (3)$$

Where the right most expression of equation (3) shows that the reduced strain measure $\bar{E}$ has the same non-zero eigenvalues as the 3D Green strain E, but ignores its irrelevant null space. In some embodiments, some or all of the left most equality of equation (3) may be initialized as part of block 310 (e.g. symbolically and/or using automatic differentiation). Once initialized in the manner, specific values of the strain measure may be numerically evaluated in block 410, as desired.

Method 400 then proceeds to block 420 which involves determining a strain energy W. Determining the block 420 strain energy W may be based on the block 410 reduced strain measure $\bar{E}$—e.g. the block 420 strain energy W may be a function of $\bar{E}$. Determining the block 420 strain energy W may be based on the reduced vertex coordinates $\bar{\mathbb{X}}_i$—e.g. the block 420 strain energy W may be a function of the reduced vertex coordinates $\bar{\mathbb{X}}_i$. As discussed above, the reduced vertex coordinates $\bar{\mathbb{X}}_i$ may be related to the 3D Eulerian skin coordinates $\mathbb{x}$ by QR decomposition. In some embodiments, the block 420 strain energy W is based on a model (e.g. a hyperelastic model) of the skin material. The block 420 strain energy W may be determined for each triangle or face of the skin. In some embodiments, some or all of the functional form of the block 420 strain energy may be initialized as a part of block 310 (e.g. symbolically and/or using automatic differentiation) of method 400. Once initialized in this manner, specific values of the strain energy may be numerically determined, as desired.

In some embodiments, an exemplary hyper-elastic model which may be used to model the skin material is the St. Venant-Kirchhoff model, in which case the block 420 strain energy may be given by $$W(\bar{E}) = A_{\mathbb{x}}\left(\frac{\lambda}{2}(tr\bar{E})^2 + \mu tr(\bar{E}^2)\right)$$

where $A_x$ is the area of the triangle/face in the skin space (equal to $$\frac{1}{2} \det R_{\mathbb{x}}\Big)$$

and λ and μ are the Lameé name constants. In some embodiments, other types of material models (e.g. other types of elastic or hyperelastic models) may be used for the material model in block 420.

Method 400 then proceeds to block 430 which comprises determining forces $f_{ij}$, where each $f_{ij}$ represents the contribution of a face j to the force at each vertex i. In some embodiments, some or all of functional expression(s) used to determine $f_{ij}$ in block 430 may be initialized as a part of block 310 (e.g. symbolically and/or using automatic differentiation). Once initialized in this manner, specific values of $f_{ij}$ may be numerically determined, as desired.

In some embodiments, block 430 may comprise a multi-part procedure which comprises first determining a function $\bar{f}_{ij}$ representative of the contribution of face j to the force at vertex i in reduced vertex coordinates $\bar{\mathbb{X}}$, optionally using this expression $\bar{f}_{ij}$ to determine $f_{ij}$ in skin space 14 and then using either the expression $\bar{f}_{ij}$ or the expression $f_{ij}$ to determine $f_{ij}$ in body atlas 18. The contribution of triangle j to the total force at a vertex i in reduced vertex coordinates $\bar{\mathbb{X}}_i$ may be given by $\bar{f}_{ij}=-\partial W_j/\partial \bar{\mathbb{X}}_i$. In some embodiments, the functional form of $\bar{f}_{ij}=-\partial W_j/\partial \bar{\mathbb{X}}_i$ may be initialized as a part of block 310 (e.g. symbolically and/or using automatic differentiation). This expression $\bar{f}_{ij}$ may be brought to skin space 14 for each triangle j using the transformation $Q_{\mathbb{x}j}$ according to $f_{ij}=Q_{\mathbb{x}j}\bar{f}_{ij}$. In some embodiments, once the function for $\bar{f}_{ij}=-\partial W_j/\partial \bar{\mathbb{X}}_i$ is initialized, specific values of $f_{ij}=Q_{\mathbb{x}j}\bar{f}_{ij}$ may be numerically determined, as desired. In some embodiments, the functional form of $f_{ij}=Q_{\mathbb{x}j}\bar{f}_{ij}$ may also be initialized as part of block 310. In some embodiments, the specific values of $f_{ij}$ need not be expressly initialized or evaluated, as block 430 may comprise determining $f_{ij}$ directly from $\bar{f}_{ij}$. By the principle of virtual work, the force $f_{ij}$ in skin space 14 may transformed to body atlas 18 using the transpose of the triangle's Jacobian matrix:

$$\partial \mathbb{X}/\partial u^T = (D_{\mathbb{X}} D_u^{-1})^T = D_u^{-T} D_{\mathbb{X}}^T = D_u^{-T} R_{\mathbb{X}}^T Q_{\mathbb{X}}^T \quad (4)$$

(where the triangle/face index j is suppressed for clarity in equation (4) and the thin QR decomposition of $D\mathbb{X}$ is substituted). Accordingly, the force contribution of each face j to each vertex i in body atlas 18 may be given by:

$$f_{ij}=D_{uj}^{-T} R_{\mathbb{X}j}^T Q_{\mathbb{X}j}^T f_{ij}=D_{uj}^{-T} R_{\mathbb{X}j}^T Q_{\mathbb{X}j}^T Q_{\mathbb{X}j} \bar{f}_{ij}=D_{uj}^{-T} R_{\mathbb{X}j}^T \bar{f}_{ij} \quad (5)$$

This equation (5) expression is the output of block 430 and represents the force contribution $f_{ij}$ of each face j to each vertex i in body atlas 18. Values of this equation (5) expression may be numerically determined using the functional expressions for $\bar{f}_{ij}$ or $f_{ij}$.

In some embodiments, the force contribution $f_{ij}$ of each face j to each vertex i in body atlas 18 determined in block 430 may be additionally or alternatively determined directly in terms of skin atlas coordinates $\mathbb{U}$ from $f_{ij}=-\partial W_j/\partial \mathbb{U}_i$ (i.e. without using reduced vertex coordinates $\bar{\mathbb{X}}_i$). In particular, as discussed above, $W_j$ is a function of $\bar{\mathbb{X}}_i$, which in turn is a function of $\mathbb{X}$ which in turn is a function of $\mathbb{U}_i$ (through the map π). As such, $f_{ij}=-\partial W_j/\partial \mathbb{U}_i$ may be determined directly.

Method 400 may then proceed to block 440 which may determine the total force $f_i$ at each vertex i to be the sum of the contributions $f_{ij}$ from each face j that is incident on vertex i. This may be calculated according to $f_i=\Sigma_j f_{ij}$, where the summation runs over the faces j which are incident on vertex i.

In the illustrated embodiment, the output 442 of method 400 is the total force $f_i$ at each vertex i in body atlas 18. This output 452 may also be the output of block 320 (FIG. 4).

Returning to method 300 (FIG. 4), once the total force $f_i$ at each vertex i in body atlas 18 is determined in block 320, method 300 proceeds to block 330. Block 330 comprises using the block 320 force $f_i$ and the movement of the body between time steps (e.g. x(k) and x(k+1) or φ(k) and φ(k+1) or some combination of these inputs) to determine the Eulerian skin atlas coordinates $\mathbb{U}$ for the skin at the next time step (e.g. $\mathbb{U}$(k+1) or κ(k+1) or ψ(k+1)). In some embodiments, configuration of the skin may be completely determined by the Eulerian vertex coordinates $\mathbb{U}$ in skin atlas 20 and the coordinates of the body vertices x in physical space 10. Therefore, a space $\mathbb{U}$ (which may be referred to as a skin configuration space) may be defined to include all $\mathbb{U}$s values at the skin vertices. The standard methods of classical mechanics could be used to write the dynamics of the skin entirely in terms of the array of stacked $\mathbb{U}$ coordinates and its derivatives.

The embodiments described herein, however, do not use the Lagrangian discretization where the skin space value $\mathbb{U}_i$ at mesh vertex i is a fixed point on the skin and where the mesh is fixed on the skin and moves on the body during simulation. Instead, embodiments of the invention described herein use an Eulerian discretization where the skin space value $\cap_i$ at mesh vertex i is a Eulerian coordinate representative of the skin material that is currently at a fixed point on the body and where the mesh is fixed on the body and moves on the skin during simulation. For this reason, imposing a constraint on the skin's motion relative to the body, such as attachment of the skin to specific points on the body, may be significantly simplified over a corresponding Lagrangian discretization.

Figure 6:
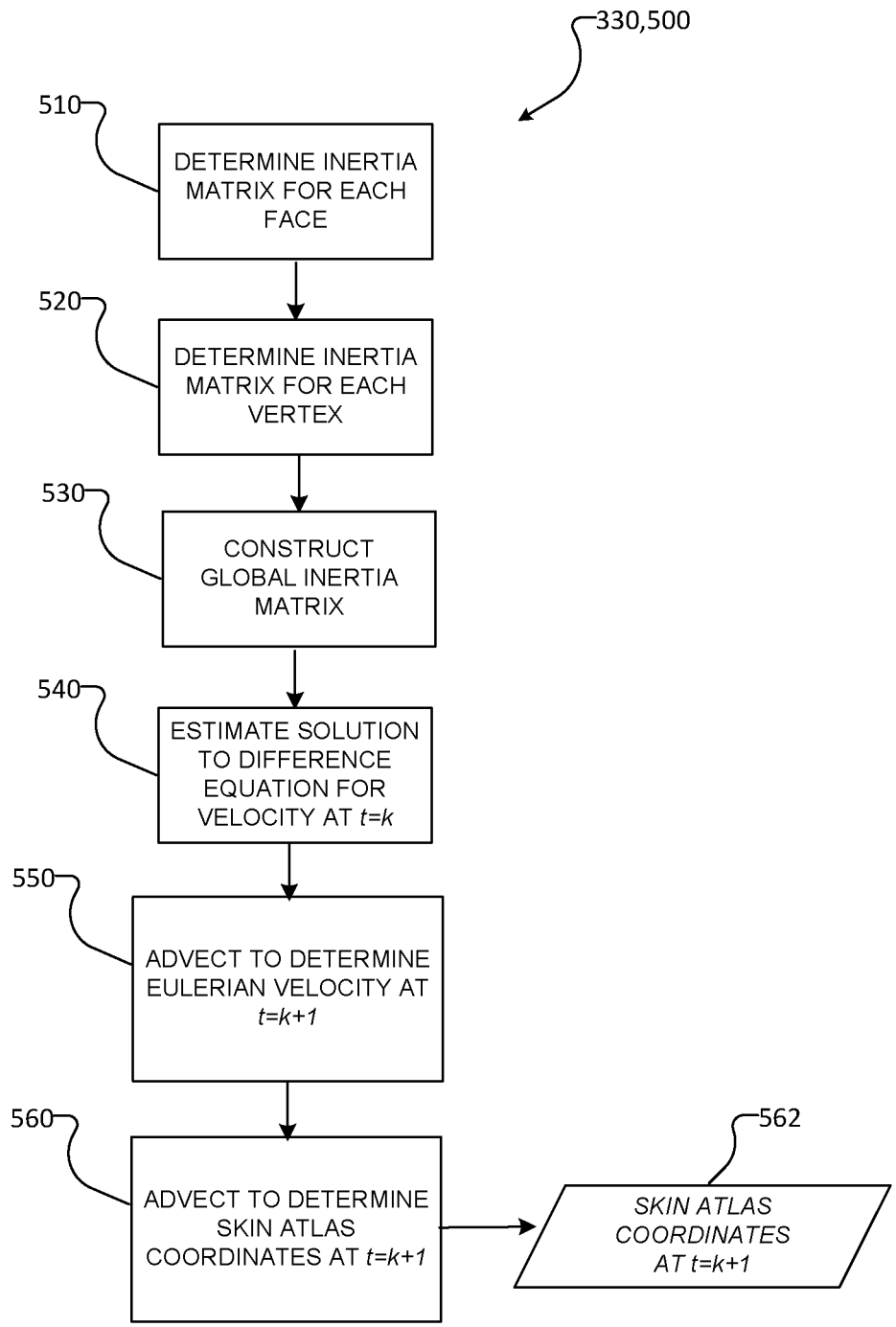
FIG. 6 is a schematic diagram of a method for using the force $f_i$ on each vertex in body atlas coordinates u together with the body movement in physical space to determine Eulerian 2D skin atlas coordinates $\mathbb{U}$ for the skin at the next time step which may be used for the method of FIG. 4 in some embodiments.

FIG. 6 is a schematic block diagram of a method 500 for using the force $f_i$ on each vertex in body atlas 18 (e.g. the output of block 320) together with the body movement in physical space (e.g. x(k) and x(k+1) or ϕ(k) and ϕ(k+1) or some combination thereof as input data 102) to determine the Eulerian 2D skin atlas coordinates 𝕌 for the skin at the next time step (e.g. 𝕌(k+1) or κ(k+1) or ψ(k+1)). In the particular case of the illustrated embodiment of FIG. 6, method 500 uses inputs x(k) and x(k+1) to determine output 𝕌(k+1). Method 500 of FIG. 6 may be used to implement block 330 of FIG. 4 method 300 in some embodiments. Method 500 commences in block 510 which comprises determining an inertia matrix $M_j$ for each face j of the skin.

Consider the material velocity $\mathbb{v}$ of a skin atlas vertex 𝕌 (which is at body location u in the Eulerian setting). Its velocity in physical space 10 may be provided by $\dot{x}=\Gamma \mathbb{v}$ where Γ is defined to be the Jacobian matrix (Γ=∂x/∂u) between body atlas 18 and physical space 10 (see FIG. 1). The material velocity $\mathbb{v}$ may be considered to be made up of two components (i.e. $\mathbb{v}=\mathbb{v}_b+\mathbb{v}_{sb}$) where $\mathbb{v}_b$ represents the velocity of the body in physical space and $\mathbb{v}_{sb}$ represents the velocity of the skin relative to the body. The term $\mathbb{v}_b$ may be determined from $\dot{x}_b$ (i.e. body velocity in physical space 10) as a solution to the equation $\dot{x}_b=\Gamma \mathbb{v}_b$. The body velocity $\dot{x}_b$ may be estimated as $$\dot{x}_b = \frac{\Delta x}{h} = \frac{x(k+1) - x(k)}{h},$$

where h is the size (e.g. duration) of the time step.

The kinetic energy of the skin may be given by:

$$T = \frac{1}{2}\int_{A_u} \rho \mathbb{v}^T \Gamma^T \Gamma \mathbb{v} dA_u = \frac{1}{2}\mathbb{v}^T\left(\int_{A_u} \rho \Gamma^T \Gamma dA_u\right)\mathbb{v} \quad (5A)$$

where matrix in parentheses in the right hand side of equation (5A) is the generalized inertia M, ρ is a mass per unit area which is given by the material model and A is area of the skin face (e.g. the skin triangle).

At a given time step, the Jacobian matrix $\Gamma=D_x D_u^{-1}$ is constant within each triangle j. Computing this Jacobian matrix Γ may be performed in the context of determining the inertia matrix $M_j$ for each face j in block 510. The matrix $D_u^{-1}$ is also constant in time (and may be determined in block 510 or pre-computed (e.g. in block 310) in some embodiments). The velocity $\mathbb{v}$ of a face j may be considered approximately constant in each triangle j and this constant may be considered to be the average of the velocities of the vertices of the face—for example, in the case of a triangular mesh, by $$\mathbb{v}_j = \frac{1}{3}\sum_{i \in vert(j)} \mathbb{v}_i.$$

Then, the inertia contribution of each triangle j may be determined in block 510 according to:

$$M_j = \mathbb{m}_j \Gamma_j^T \Gamma_j \quad (6)$$

where $\mathbb{m}_j$ is the mass of the skin in triangle j, which may be computed using the vertex values in skin space 14 and density (which may be provided by the material model of the skin as part of input data 102).

Method 500 then proceeds to block 520 which comprises determining the inertia matrix $M_i$ at each vertex i. For a particular vertex i, the inertia matrix $M_i$ may be determined to be the average inertia of the incident faces on that vertex i. In the case of a triangular mesh, the inertia matrix $M_i$ at each vertex i may be determined according to $$M_i = \frac{1}{3}\sum_j M_j$$

where $M_j$ is given by equation (6) and the summation index j runs over the three triangles incident on vertex i. The vertex inertias $M_i$ generated in block 520 may be 2×2 matrices. Method 500 may then proceed to block 530 which may comprise assembling the block 520 2×2 vertex matrices $M_i$ into a global block diagonal inertia matrix M—e.g. by aligning the vertex matrix $M_i$ for each vertex i along the diagonal of the global block diagonal inertia matrix M.

Method 500 may then proceed to block 540 which comprises determining or estimating a solution to a difference equation (also referred to as time stepping, time stepping a model and/or using a numerical integration scheme to estimate a solution to a differential equation) to obtain an expression for $\tilde{\mathbb{v}}^{(k+1)}$ where the tilde is used to reflect the fact that $\tilde{\mathbb{v}}^{(k+1)}$ is the material velocity of a vertex of the skin that was at the vertex at step k and an advection step may be used to arrive at the Eulerian velocity at step k+1, $\mathbb{v}^{(k+1)}$. In general, any suitable difference equation may be used to describe the equation of motion of the skin. In one particular embodiment, block 540 comprises using the linearly implicit after time discretization given by:

$$\left(M + h^2 \frac{\partial f}{\partial u}\right)\tilde{\mathbb{v}}^{(k+1)} = M\mathbb{v}^{(k)} + h(f^{(k)} + b^{(k)}) \quad (7)$$

where h is the size of the time step; f is the block 320 elastic force at each vertex; b is body force due to gravity or other phenomena (including the user), applied in the physical space and transformed to the body atlas by $\Gamma^T$. To obtain ∂f/∂u, the functional expression ∂f/∂$\overline{x}$ may be initialized (e.g. symbolically and/or using automatic differentiation and, for example, as a part of block 310) and then transformed in a manner similar to equation (5) for evaluation in body atlas 18, as desired. This is not necessary, however. In some embodiments, ∂f/∂u may be directly determined (e.g. symbolically and/or using automatic differentiation and, for example, as a part of block 310). In other embodiments, other techniques may be used to determine or estimate ∂f/∂u. It may be noted that the global block-diagonal inertia matrix M depends on the skin configuration, which gives rise to a "quadratic velocity vector" term in the dynamics. This quadratic term is not significant for typical skin movements, so it may be ignored in some embodiments. The equation (7) difference equation is stable, but adds time-step dependent numerical damping, which is not a significant problem for skin movement. If desired, other types of integration schemes can be used in block 540.

Once the quantity $\tilde{\mathbb{v}}^{(k+1)}$ is determined in block 540, method 500 proceeds to block 550 which comprises advecting the velocity field $\tilde{v}^{(k+1)}$ to obtain an Eulerian velocity $v^{(k+1)}$ (i.e. a velocity of a material point of the skin which has been advected to the vertex at time (k+1)). In some embodiments, this block 550 advection procedure may comprise using a stable semi-Lagrangian method and a corresponding software routine. Other advection techniques and corresponding software functions are known in field of modeling fluid mechanics. In some embodiments, block 550 may comprise using more sophisticated advection techniques developed in fluid mechanics. In general, method 500 may be agnostic to the particular choice of advection technique. In general, an advection routine applied to any material quantity $\tilde{q}$ to obtain a corresponding advected quantity q:

$$q = \text{advect}(v_{sb}, h, \tilde{q}) \quad (8)$$

Where h is the size of the time step referred to above and $v_{sb}$, as used in the expression of equation (8) is the material velocity of the skin relative to the body, as discussed above. Using this advection routine, block 550 comprises advecting the quantity $\tilde{v}^{(k+1)}$ (which represents $\tilde{q}$ in equation (8)) with $v_{sb} = \tilde{v}^{(k+1)} - v_b^{(k+1)}$ to obtain an Eulerian velocity $v^{(k+1)}$ (which represents q in equation (8)).

Method 500 then proceeds to block 560, where the block 560 Eulerian velocity $v^{(k+1)}$ is integrated by advecting Eulerian skin atlas coordinates $\mathbb{U}^{(k)}$ to obtain the Eulerian skin atlas coordinates $\mathbb{U}$ at the next time step (e.g. $\mathbb{U}^{(k+1)}$) according to:

$$\mathbb{U}^{(k+1)} = \text{advect}(v_{sb}, h, \tilde{\mathbb{u}}^{(k+1)}) \quad (9)$$

In some embodiments $\tilde{\mathbb{u}}^{(k+1)}$ may be taken to be $\mathbb{U}^{(k)}$ (i.e. the skin atlas coordinate at time step k). In other embodiments, the skin atlas coordinate may be modified to account for body velocity by advection by the negative of the body velocity, $\tilde{\mathbb{u}}^{(k+1)} = \text{advect}(-v_b^{(k+1)}, h, \mathbb{U}^{(k)})$. The output 562 of block 560 are the 2D Eulerian skin atlas coordinates un at the next time step (e.g. $\mathbb{U}^{(k+1)}$).

Returning to method 100 (FIG. 2), once the 2D Eulerian skin atlas coordinates $\mathbb{U}^{(k)}$, $\mathbb{U}^{(k+1)}$, ... are determined in block 120, these 2D Eulerian skin atlas coordinates $\mathbb{U}^{(k)}$, $\mathbb{U}^{(k+1)}$, ... may, in the illustrated embodiment, be provided to a graphics engine (e.g. a graphics processing unit (GPU)) or some other suitable graphics processing portion of a computer in block 130. As discussed above, in some embodiments method 100 may be performed in whole or in part by a graphics processing engine or a suitable graphics processing portion of a computer, in which case block 130 may not be strictly necessary. Method 100 then proceeds to block 140 which involves displaying the graphics (e.g. animation) of the skin. In the illustrated embodiment, the block 140 display is based on 2D Eulerian skin atlas coordinates $\mathbb{U}^{(k)}$, $\mathbb{U}^{(k+1)}$, ... The 2D Eulerian skin atlas coordinates at each time step (e.g. $\mathbb{U}^{(k)}$, $\mathbb{U}^{(k+1)}$, ...) may be directly used by the graphics processing engine or a suitable graphics processing portion of a computer to display the appearance of the skin after movement (e.g. to animate the skin). Visual properties of skin, such as color and texture, may be associated with skin material points, and may be stored in memory accessible to the graphics processing engine or a suitable graphics processing portion of a computer using image data known as texture maps. For each displayed surface face (e.g. surface triangle), the graphics processing engine or a suitable graphics processing portion of a computer may color the pixels covered by the surface on the display using the image data, employing a technique known as texture mapping. It will be appreciated, that in some embodiments, method 100 may be performed in real time that is 2D Eulerian skin coordinates (e.g. $\mathbb{U}^{(k)}$, $\mathbb{U}^{(k+1)}$, ...) can be determined for each successive time step so that they are available in time to provide each frame of a video/animation sequence that may be displayed in block 140. In some embodiments, portions (or all) of method 100 (e.g. blocks 110 and 120) may be performed in advance and buffered or otherwise stored in memory accessible to the graphics processing engine or a suitable graphics processing portion of a computer before beginning block 140.

The motion of the body may influence the motion of the skin in a complex manner, including, for example, via non-penetration constraints and viscous resistance to sliding. In animal skin, the connective tissue fibers anchoring skin to subcutaneous structures have highly nonlinear elastic behavior; the stress-strain curve may have a low force "toe" region in the physiological range, but may become relatively stiff beyond that region. Some embodiments may comprise modelling some of these features to some extent. In addition, some embodiments provide sufficient modeling flexibility for an artist to choose to have elastodynamic skin only on a region of interest of the body, and have a small number of parameters to control the behavior of skin relative to the body in the region of interest.

Some embodiments comprise using constraints to provide a technique for attaching skin to the body and/or for setting boundary conditions on a region of interest to be simulated. Attachments at vertex positions represent one form of constraint that may be enforced in the Eulerian setting, since the constraints may be collocated with state variables (e.g. Eulerian skin atlas coordinates $\mathbb{U}$ and corresponding Eulerian skin atlas velocity coordinates $\tilde{v}$). At the Eulerian velocity level, the constraints on vertex i are of the general form $G\tilde{v} = g$, which may be referred to herein as the Eulerian velocity-level constraint equation. In some embodiments, these types of constraints may be provided to method 100 as part of input data 102, for example. Skin velocity may be obtained by simultaneously solving equation (7) with the velocity-level constraint (e.g. in block 540 of method 500 (FIG. 6)), using the Karush-Kuhn-Tucker (KKT) equations for the constrained dynamical system:

$$\begin{pmatrix} M^* & G^T \\ G & 0 \end{pmatrix} \begin{pmatrix} \tilde{v}^{(k+1)} \\ \lambda \end{pmatrix} = \begin{pmatrix} f^* \\ g \end{pmatrix} \quad (10)$$

where $\lambda$ is the vector of Lagrange multipliers, $M^* = M + h^2 \partial f / \partial u$ and $f^* = M\tilde{v}^{(k)} + h(f^{(k)} + b^{(k)})$ (compare to equation (7)). Solving equation (10) by a suitable method determines $\tilde{v}^{(k+1)}$, which may be processed, for example, according to the above-discussed procedures of blocks 550 and 560.

These types of constraints can model a variety of conditions. When the skin is fixed to the body at vertex location $u_i$, the velocity $\tilde{v}_i = -v_{bi}$. This condition may be enforced by setting G=I and $g = -v_{bi}$ in the above-described Eulerian velocity-level constraint equation. More generally, these types of constraints may be used to constrain a skin vertex to not move along the normal a to a constraint curve, while allowing the skin vertex to slide along the constraint curve. In such a case, the constraint may be given by $a^T \tilde{v} = -a^T v_{bi}$ and may be enforced by setting $G = a^T$ and $g = -a^T v_{bi}$ in the above-described Eulerian velocity-level constraint equation.

Another additional or alternative type of constraint, which may be used in some embodiments, provides elastic coupling of the skin to body over an extended region. This type of constraint may be used to model the connective tissue that binds skin to body. As with the deformation of the skin, the elastic coupling of the skin to the body may be modeled using a strain energy $W_c$ which is a characteristic of the elastic coupling. In contrast to the strain energy of the skin (W) discussed above which depends on the deformation of the skin, the coupling strain energy $W_c$ depends on the relative separation of the skin and body, and not on skin deformation alone. If the initial coordinates $\mathbb{X}$ in skin space 14 coincide with the initial coordinates X in body space 12, the separation of each skin vertex at time step k is $s_i^{(k)} = \mathbb{X}_i^{(k)} - X_i$. If $p_i$ is the barycentric coordinate of a point $\mathbb{p}$ in triangle j associated with vertex i, the separation of that point is $$s^{(k)} = \sum_{i \in vert(j)} s_i^{(k)} p_i$$

where i ranges over the vertices of triangle j. A suitable 1D elastic material model (such as, by way of non-limiting example, a Fung elastic model) may be used to determine the strain energy associated with the separation of a skin point $\mathbb{p}$. The strain energy associated with a triangle may then be determined by integrating the strain energy associated with point $\mathbb{p}$, as $\mathbb{p}$ varies over the triangle. Once the coupling strain energy $W_c$ is computed per triangle, it may be added to the strain energy of deformation of the triangle, W, and used to compute per vertex forces $f_i$, for example, in the same manner as blocks 430 and 440 discussed above. In some embodiments, references to strain energy may be considered to include both the strain energy of the skin itself and the strain energy W associated with the coupling $W_c$ between the skin and the body. The integrations and differentiations required may be carried out by numerically, symbolically, or by some other means.

As discussed above, one input 102 to method 100 is the deformation of the body in physical space at the next time step (e.g. $x^{(k+1)}$). Skin points that are not explicitly constrained as above may still be influenced by implicit contact constraints. Accordingly, some embodiments comprise considering $x^{(k+1)}$ to be a target vertex displacement at the next time step, where the target vertex displacement at the next time step $x^{(k+1)}$ is related to the current vertex location $x^{(k)}$ by a parameter $\Delta x$:

$$\Delta x = x^{(k+1)} - x^{(k)} \quad (11)$$

This parameter $\Delta x$, which may be given as part of input 102, for example, may be used to determine the body velocity in physical space, $\dot{x}_b$, and in body space, $v_b$ (as discussed above). In some embodiments, $v_b$ may be computed using $v_b = \Gamma^\dagger \dot{x}_b$, where $\Gamma^\dagger$ is the pseudo-inverse of $\Gamma$. In some embodiments $\Delta x$ may be modified to a modified displacement $\Delta x'$ that enforces these constraints approximately in each time step.

The parameter $\Delta x$ may be decomposed into a normal component $\Delta x_n$ and a tangential component $\Delta x_t$. To enforce non-penetration and non-separation constraints, $\Delta x_n$ may be left unchanged, so that the skin tracks the body in the normal direction. In the tangential direction, there may be some skin damping and also a limit on the amount of strain ($\Delta_{max}$) that may model the biphasic behavior of collagen in skin. Some embodiments may comprise determining a corrected tangential displacement $$\Delta \bar{x}_t = \frac{\Delta x_t}{\|\Delta x_t\|} \min(\|\Delta x_t\|, \Delta_{max})$$

and scale it with the parameter $\zeta$ to get a modified displacement $\Delta x'$ given by:

$$\Delta x' = \Delta x_n + \zeta \Delta \bar{x}_t \quad (12)$$

where $\zeta$ is an "inverse damping" parameter which may be user-configurable and where: $\zeta = 1$ approximates infinite friction so that the skin material sticks tightly on the body mesh; $\zeta = 0$ makes the sliding motion highly underdamped (there is still resistance to motion due to tension from neighboring vertices and artificial damping from implicit integration). In some embodiments, the body velocity may be modified to $$\dot{x}'_b = \frac{\Delta x'}{h}.$$

Consequently, $v_b$ at the next time step (k+1) may be determined using $\dot{x}_b'$ or $\Delta x'$ and the pseudoinverse $\Gamma^\dagger$:

$$v_b = \Gamma^\dagger \frac{\Delta x'}{h} = \Gamma^\dagger \dot{x}'_b \quad (13)$$

Where the target shape is compared to the actual skin shape at each time step in Eq. (11), errors are eventually corrected and there is no constraint drift.

Pseudocode used for performing method 100 according to a particular embodiment is shown below.

| Algorithm 1 Thin Skin Elastodynamics | |
|---|---|
| 1: // Initialization | |
| 2: Build a discretization of $\pi$ with X and u | |
| 3: // Simulation loop | |
| 4: while simulating do | |
| 5:    Move mesh vertices to $x^{(k+1)}$ via external driver | |
| 6:    // Dynamics coupling | |
| 7:    for all verts i do | |
| 8:       Get modified displacement $\Delta x'_i$ | // Eq. (12) |
| 9:    end for | |
| 10:    for all triangles j with verts i do | |
| 11:       Compute $v_b$ | // Eq. (13) |
| 12:    end for | |
| 13:    Advect with $-v_b$ to obtain $\tilde{u}^{(k+1)}$ | // Eq. (8) |
| 14:    // Elastic force | |
| 15:    for all verts i do | |
| 16:       Look up $\mathbb{X}_i$ with $u_i$ via $\pi$ | |
| 17:    end for | |
| 18:    for all triangles j with verts i do | |
| 19:       Compute elastic force $f_{ij}$ | // Eq. (5) |
| 20:       Compute $M_j$ | // Eq. (6) |
| 21:    end for | |
| 22:    // Time integration | |
| 23:    Form KKT system and solve for $\tilde{\mathbb{v}}^{(k+1)}$ | // Eq. (10) |
| 24:    Advect the velocity $\tilde{\mathbb{v}}^{(k+1)}$ to obtain $\mathbb{v}^{(k+1)}$ | // Eq. (8) |
| 25:    Advect skin positions $\tilde{u}^{(k+1)}$ to obtain $u^{(k+1)}$ | // Eq. (9) |
| 26: end while | |

Figure 7:
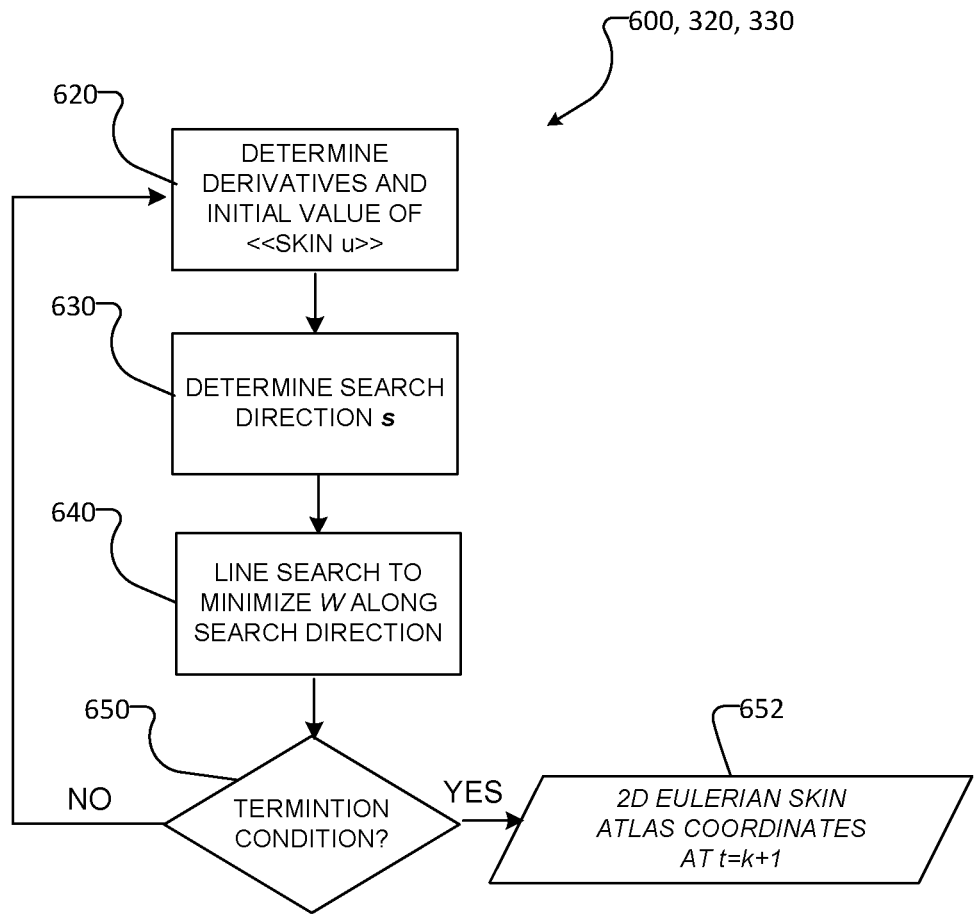
FIG. 7 is a schematic depiction of a method for determining 2D Eulerian skin atlas coordinates $\mathbb{U}$ for a next time step which may be used in the method of FIG. 4 in some embodiments.

In some embodiments, 2D Eulerian skin atlas coordinates $\mathbb{u}^{(k)}$, $\mathbb{u}^{(k+1)}$, . . . may be determined by a so-called quasistatic simulation. In a quasistatic simulation, the strain energy W of the skin is minimized, subject to any constraints imposed on the movement of the skin. FIG. 7 is a schematic depiction of a method 600 for using the force f on each vertex in body atlas coordinates u together with the body movement in physical space to determine Eulerian 2D skin atlas coordinates $\mathbb{u}$ for the skin in process comprising quasistatic simulation, i.e., one which minimizes the strain energy of the skin at each time step. Method 600 may be used to implement blocks 320, 330 of FIG. 4 in some embodiments.

It may be recalled that for any fixed set of physical space coordinates, the strain energy of the skin, W, may be written as a function of the Eulerian coordinates $\mathfrak{U}$ of skin atlas 20 using the methods described above. This function may be minimized by any suitable technique. Some non-limiting examples of suitable techniques for unconstrained minimization include: the Non-Linear Conjugate Gradient method, Newton's method, Quasi-Newton methods, Truncated-Newton methods and/or the like. Some non-limiting examples of suitable techniques for constrained minimization include: Interior Point methods, Active Set methods, and Sequential Quadratic Programming methods.

In some embodiments, method 600 comprises an iterative approach to the minimization of the strain energy W. At each iteration, method 600 commences in block 620 with an initial value of $\mathfrak{U}$, and, if these quantities are not already known, determines the per vertex force (e.g. the gradient of W or $f_i = -\partial W/\partial \mathfrak{U}_i$) and optionally, the previous values of vertex force, or the gradient of the vertex force (e.g. the Hessian of W $(-\partial f_i/\partial \mathfrak{U}_j)$). Method 600 then proceeds to block 630 which comprises determining the search direction s based on the block 610 derivatives. After determining the search direction s in each iteration, method 600 proceeds to block 640 where the strain energy W is minimized along the block 630 search direction s. The block 640 minimizing $\mathfrak{U}$ value may be used as the initial value for the next iteration (e.g. in the next iteration of block 620). The iterations may proceed until some suitable iteration termination condition is met in block 650. Non-limiting examples of iteration termination conditions that may be used in block 650 include: the strain energy W is sufficiently reduced (e.g. in comparison to some suitable and threshold), the number of iterations reached a threshold iteration number, the time associated with the minimization has reached a temporal threshold, the amount of progress between successive iterations is below a change threshold for a number of iterations and/or the like. In some embodiments, the parameters of the block 650 iteration termination conditions may be configurable (e.g. user configurable) and may, for example, be provided to method 100 as input 102. When the block 650 iteration termination condition is satisfied (block 650 YES branch), then method 600 returns the updated skin atlas value $\mathfrak{U}^{(k+1)}$ (shown as 652 in FIG. 7).

The methods described herein may be implemented by one or more suitable computers, which may, in some embodiments, comprise components of suitable computer systems. By way of non-limiting example, such computers could comprise part of a computer-graphics or animation system. In general, such computers may comprise any suitably configured processor, such as, for example, a suitably configured general purpose processor, graphics processing unit (GPU), graphics processing system, microprocessor, microcontroller, digital signal processor, field-programmable gate array (FPGA), other type of programmable logic device, pluralities of the foregoing, combinations of the foregoing, and/or the like. Such a computer may have access to software which may be stored in computer-readable memory accessible to the computer and/or in computer-readable memory that is integral to the computer. The computer may be configured to read and execute such software instructions and, when executed by the computer, such software may cause the computer to implement some of the functionalities described herein.

Certain implementations of the invention comprise computers and/or computer processors which execute software instructions which cause the computers and/or processors to perform a method of the invention. For example, one or more processors in a computer system may implement data processing steps in the methods described herein by executing software instructions retrieved from a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical (non-transitory) media such as magnetic data storage media including floppy diskettes, hard disk drives, optical data storage media including CD ROMs, DVDs, electronic data storage media including ROMs, flash RAM, or the like. The instructions may be present on the program product in encrypted and/or compressed formats.

Where a component (e.g. a software module, controller, processor, assembly, device, component, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

While a number of exemplary aspects and embodiments are discussed herein, those of skill in the art will recognize certain modifications, permutations, additions and sub-combinations thereof. For example:

In some embodiments described above, the skin is modelled using hyperelastic material (e.g. hyperelastic membrane) model. This is not necessary. In some embodiments, the skin may be modeled by different material models. By way of non-limiting example, such material models may include general elastic material models.

A feature of using the Eulerian approach is that simulation may be performed in terms of 2D Eulerian coordinates un in skin atlas 20. However, in some applications and embodiments, it is desirable for method 100 to produce a "Lagrangian output". For example, if, for a particular vertex, a material point of the skin had initial coordinates $\mathfrak{U}(0)$ at the initial time step, a Lagrangian output at time step k may be the coordinates of this material point in physical space 10. In some embodiments, method 100 can provide such Lagrangian output by interpolating Eulerian skin atlas coordinates $\mathfrak{U}$ of the mesh. The first step for generating such Lagrangian output comprises locating the triangle at time step k in skin atlas 20 that contains $\mathfrak{U}(0)$. This is a standard "point location" problem in the field of computational geometry and may be accomplished by any of a wide variety of suitable techniques known to those skilled in the art. In a second step, the point corresponding to $\mathfrak{U}(0)$ in physical space 10 may be determined (e.g. estimated) by linear (e.g. barrycentric) interpolation from the vertices of the triangle located in the first step. A similar procedure may be performed for every vertex of the initial skin atlas mesh. The resulting output will appear Lagrangian, even though Eulerian simulation is used internally.

It will be appreciated by those skilled in the art that a smooth (or piece-wise smooth) shape may be represented by suitable techniques other than using a single polygonal mesh. Examples of such techniques include non-uniform rational B-spline (NURBS) surfaces, subdivision surfaces, multiresolution meshes and/or the like. In each of these techniques, there are equivalent methods for determining the mappings between the various spaces of FIG. 1 described above and for determining the Jacobians of these mappings. For example, a straightforward method which may be used in some embodiments comprises tessellating the smooth surface into polygons and then using the methods described herein for polygonal meshes. Alternative methods for computing the mappings and Jacobians directly on the smooth surface also exist. Some embodiments comprise representing the skin and/or the body using other such representations.

Some embodiments may simulate multiple layers of "skin". In some embodiments, this may be accomplished by treating the body and a first (e.g. internal) skin layer together as a body for a second (e.g. external) skin layer. As discussed above, it is not necessary that any of the skin layers is strictly a skin and any skin layer could be a skin-like layer. By way of non-limiting example, a first (e.g. internal) skin layer could comprise an actual skin and a second (e.g. external) skin layer could be a piece of clothing. Such nested skin layers are not limited to just two skin layers and could be any suitable number of skin layers.

In addition to the outputs described above, some embodiments may comprise outputting the strain energy W (or $W_j$ the strain energy for each face j). By way of non-limiting example, such strain energy values may be used, for example, to model wrinkles, tearing and plastic deformation of the skin.

So in the embodiments described above, the skin (e.g. as tracked by Eulerian skin space or skin atlas coordinates) moves in response to movement of the body. This is not necessary. In some embodiments, the skin may additionally or alternative be provided with some initial strain and the skin may move in response to such strain with or without corresponding body movement. In some embodiments, the skin may additionally or alternatively be subjected to other external forces (e.g. gravity) and the skin may move in response to such external forces with or without corresponding body movement.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for simulating movement of a skin associated with a body, the method comprising:
defining the body as a mesh comprising a plurality of vertices;
defining a set of reference skin coordinates which correspond to material points of the skin associated with the body and moveable relative to the body;
maintaining, by a computer, a representation of the skin, wherein maintaining the representation of the skin comprises:
maintaining associated data for each vertex, the associated data for each vertex comprising:
constant body coordinates which represent a location of the vertex relative to the body; and
Eulerian skin coordinates determined by a computer implementation of an Eulerian simulation, the Eulerian skin coordinates specifying which one or more reference skin coordinates from among the set of reference skin coordinates correspond to the location of the vertex at any particular time; and
for each vertex:
evolving, by the computer implementation of the Eulerian simulation, the Eulerian skin coordinates over a series of one or more discrete time steps between an earlier time and a later time, the Eulerian skin coordinates at the later time specifying one or more updated reference skin coordinates from among the set of reference skin coordinates which correspond to the location of the vertex as represented by the constant body coordinates at the later time and which are different from the one or more reference skin coordinates which correspond to the location of the vertex at the earlier time; and
maintaining the body coordinates constant, while evolving the Eulerian skin coordinates over the series of one or more discrete time steps between the earlier time and the later time.

2. A method according to claim 1 wherein the associated data for each vertex comprises physical space coordinates which correspond to the body coordinates and which represent a location on the body in physical space at any particular time.

3. A method according to claim 1 wherein evolving the Eulerian skin coordinates over the series of one or more discrete time steps between the earlier time and the later time comprises modelling, by the computer, a manner in which the skin moves in response to a change in the physical space coordinates over the series of one or more discrete time steps between the earner time and the later time.

4. A method according to claim 1 wherein evolving the Eulerian skin coordinates over the series of one or more discrete time steps between the earlier time and a later time comprises modelling, by the computer, a manner in which the skin moves in response to a change in a body motion map $\phi$ over the series of one or more discrete time steps between the earlier time and the later time, wherein the body motion map $\phi$ maps between the body coordinates and the physical space coordinates.

5. A method according to claim 3 wherein the mesh comprises a polygonal mesh wherein groups of vertices are associated into corresponding polygonal faces.

6. A method according to claim 5 wherein modelling the manner in which the skin moves comprises determining, by the computer and for each polygonal face, a representation of a deformation gradient which comprises a rate of change of the physical space coordinates with respect to the Eulerian skin coordinates.

7. A method according to claim 6 wherein determining the representation of the deformation gradient comprises, for each polygonal face, determining, by the computer, a reduced deformation gradient $\bar{F}$ whose non-zero singular values are the same as those of a complete deformation gradient.

8. A method according to claim 5 wherein modelling the manner in which the skin moves comprises, for each polygonal face, determining, by the computer, a strain measure.

9. A method according to claim 5 wherein modelling the manner in which the skin moves comprises, for each polygonal face, determining, by the computer, a strain energy.

10. A method according to claim 5 wherein modelling the manner in which the skin moves comprises determining, for each vertex and by the computer, a per vertex force associated with movement of the body over the series of one or more discrete time steps between the earlier time and the later time.

11. A method according to claim 9 wherein modelling the manner in which the skin moves comprises determining, for each vertex and by the computer, a per vertex force associated with movement of the body over the series of one or more discrete time steps between the earlier time and the later time based on the strain energy.

12. A method according to claim 10 wherein determining the per vertex force for each vertex comprises:
  determining, for each face and for each vertex in the face and by the computer, a force contribution associated with movement of the body over the series of one or more discrete time steps between the earlier time and the later time; and
  for each vertex, combining, by the computer, the force contributions associated with the faces incident on the vertex to determine the per vertex force.

13. A method according to claim 11 comprising:
  parameterizing the body in terms of a two-dimensional body space;
  parameterizing the skin in terms of a two-dimensional skin space wherein the set of reference skin coordinates comprise a set of two-dimensional reference skin coordinates which correspond to the material points of the skin; and
  wherein, for each vertex:
    the body coordinates comprise constant two-dimensional body coordinates which represent a two-dimensional location of the vertex in the two-dimensional body space; and
    the Eulerian skin coordinates comprise two-dimensional Eulerian skin coordinates specifying which one or more two-dimensional reference skin coordinates from among the set of reference two-dimensional skin coordinates correspond to the location of the vertex at any particular time.

14. A method according to claim 13 wherein modelling the manner in which the skin moves comprises determining, for each vertex and by the computer, a per vertex inertia matrix based at least in part on a Jacobian matrix $\Gamma$ which relates the rate of change of the physical space coordinates with respect to the two-dimensional body coordinates.

15. A method according to claim 5 wherein modelling the manner in which the skin moves comprises solving, by the computer, a difference equation to determine, for each vertex, a velocity of the material point of the skin.

16. A method according to claim 9 wherein modelling the manner in which the skin moves comprises minimizing, by the computer, the strain energy.

17. A method according to claim 1 wherein maintaining the representation of the skin comprises maintaining a piecewise smooth representation which comprises at least one of: a non-uniform rational B-spline surface, a subdivision surface and a multiresolution mesh.

18. A method according to claim 5 wherein an initial representation of the skin comprises a piecewise smooth representation which comprises at least one of: a non-uniform rational B-spline surface, a subdivision surface and a multiresolution mesh; and wherein the method comprises generating, by the computer, the polygonal mesh based on the piecewise smooth initial representation.

19. A method according to claim 1 comprising using the representation of the skin to display, by the computer, a graphical representation of the skin.

20. A system for simulating movement of a skin associated with a body, the system comprising a processor configured to perform a method according to claim 1.

21. A computer program product comprising machine-readable instructions embodied on a non-transitory medium, which instructions, when executed by a suitable processor cause the processor to perform the method of claim 1.

* * * * *